United States Patent
Li et al.

(10) Patent No.: US 11,150,095 B2
(45) Date of Patent: Oct. 19, 2021

(54) METHODS AND APPARATUSES FOR PREDICTING A DESTINATION OF A USER'S CURRENT TRAVEL PATH

(71) Applicant: Bayerische Motoren Werke Aktiengesellschaft, Munich (DE)

(72) Inventors: Qing Li, Chicago, IL (US); Jilei Tian, Chicago, IL (US)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/186,162

(22) Filed: Nov. 9, 2018

(65) Prior Publication Data
US 2019/0145779 A1    May 16, 2019

(30) Foreign Application Priority Data

Nov. 10, 2017 (EP) ..................................... 17201001

(51) Int. Cl.
| | | |
|---|---|---|
| G01C 21/20 | (2006.01) | |
| G01C 21/34 | (2006.01) | |
| G01C 21/36 | (2006.01) | |

(52) U.S. Cl.
CPC ......... *G01C 21/20* (2013.01); *G01C 21/3484* (2013.01); *G01C 21/3492* (2013.01); *G01C 21/3617* (2013.01)

(58) Field of Classification Search
CPC ............ G01C 21/3617; G01C 21/3605; G01C 21/20; G01C 21/3484; G01C 21/3492; G01S 13/08
USPC .................................................. 701/423, 424
See application file for complete search history.

(56) References Cited

U.S. PATENT DOCUMENTS

| | | | | |
|---|---|---|---|---|
| 2006/0238409 A1* | 10/2006 | Yoshioka | ............... | G01C 21/26 342/126 |
| 2008/0082254 A1* | 4/2008 | Huhtala | ................. | G01C 21/00 701/533 |
| 2010/0094496 A1* | 4/2010 | Hershkovitz | ............ | B60L 3/12 701/22 |
| 2013/0345957 A1* | 12/2013 | Yang | ........................ | G06N 5/02 701/300 |
| 2014/0278051 A1* | 9/2014 | McGavran | ............ | G01C 21/00 701/400 |

(Continued)

FOREIGN PATENT DOCUMENTS

EP         2 743 642 A2    6/2014

OTHER PUBLICATIONS

European Search Report issued in European counterpart application No. 17201001.9-1003 dated May 30, 2018 (Nine (9) pages).

*Primary Examiner* — Isaac G Smith
(74) *Attorney, Agent, or Firm* — Crowell & Moring LLP

(57) ABSTRACT

The present disclosure relates to predicting a destination of a user's current travel path. Real-time travel data associated with the current travel path is generated, wherein the real-time travel data comprises the user's current location. A plurality of potential destinations of the current travel path are determined based on historic travel data associated with one or more historic travel paths of the user. At least one destination of the current travel path is predicted from the plurality of potential destinations based on tracking a distance from the user's current location to each of the plurality of potential destinations.

18 Claims, 6 Drawing Sheets

(56) References Cited

U.S. PATENT DOCUMENTS

2015/0253148 A1 9/2015 Moore et al.
2016/0109243 A1* 4/2016 Tseng ................. G01C 21/3484
  701/408

* cited by examiner $$f(\chi) = 1 - \frac{1}{1+e^{-(\varphi \times (\chi - D))}}$$

METHODS AND APPARATUSES FOR PREDICTING A DESTINATION OF A USER'S CURRENT TRAVEL PATH

CROSS REFERENCE TO RELATED APPLICATION

This application claims priority under 35 U.S.C. § 119 from European Patent Application No. 17201001.9, filed Nov. 10, 2017, the entire disclosure of which is herein expressly incorporated by reference.

BACKGROUND AND SUMMARY OF THE INVENTION

The present disclosure generally relates to the field of transportation and, more particularly, to methods and apparatuses for predicting a destination of a user's or vehicle's current travel path.

Today, navigation systems for vehicles are state of the art. Navigation systems may come as on-board navigation systems being part of a vehicle's infotainment system or navigation systems running on portable devices, such as smartphones, for example. Such navigation systems may commonly provide a user or driver with a favorable route to a predetermined destination possibly together with associated contextual side information, for example related to traffic conditions of the proposed route. For this purpose, a current location of the user or vehicle may be estimated using a GPS (Global Positioning System) receiver or a similar device. However, navigation systems are often only used and programmed when driving to yet unknown destinations. When driving to known destinations, however, navigation systems are often not needed since the driver is familiar with the destination and typically uses a known route to it. One drawback of not using the navigation system is that the driver is currently not provided with relevant information (e.g. traffic information, points of interest (POI), etc.) related to his/her potential route.

Thus, there is a demand to have a personalized, intelligent and contextual journey management system which can automatically detect the driver's intention without the need for the driver's input.

This demand is met by methods, apparatuses and vehicles in accordance with the independent claims. Advantageous embodiments are addressed by the dependent claims.

According to a first aspect, the present disclosure provides a method of predicting a destination of a user's current travel path. The method includes generating real-time travel data associated with the current travel path, wherein the real-time travel data comprises the user's current location. The method further includes determining a plurality of potential destinations of the current travel path based on historic travel data associated with one or more historic travel paths of the user. Further, the method includes predicting at least one destination of the current travel path from the plurality of potential destinations based on tracking a distance from the user's current location to each of the plurality of potential destinations.

Depending on whether the distance between the user's current location and a respective potential destination increases or decreases during the user's movement, the probability of the respective potential location can be decreased or increased, for example.

In some example embodiments, predicting the at least one destination can include assigning a respective weight to each of the plurality of potential destinations based on the respective potential destination's distance to the user's current location. That is, a current distance from the user/vehicle to a potential destination can be taken into account for the prediction. This can improve the live predicted destination(s).

In some example embodiments, assigning the respective weight can include assigning a first weight to a first potential destination having a first distance to the user's current location and assigning a second weight to a second potential destination having a second distance to the user's current location. When the second distance is larger than the first distance, the first weight can be chosen higher than the second weight. In other words, potential destinations closer to the user's current location can be considered more likely.

In some example embodiments, predicting the at least one destination can include assigning a respective weight to each of the plurality of potential destinations based on the respective potential destination's respective distance to the user's current location due to the user's movement. That is, a change (increment or decrement) of distance from the user/vehicle to a potential destination can also be taken into account for the prediction. This can improve the live predicted destination(s).

In some example embodiments, the weight of the potential destination can be increased if its distance to the user's current location has decreased due to the user's movement. Likewise, the weight of the potential destination can be decreased if its distance to the user's current location has increased due to the user's movement. In other words, potential destinations getting closer to the user's current location can be considered more likely than potential destinations with increasing distance.

In some example embodiments, assigning the respective weight can include assigning a first weight to a first potential destination having a current first distance to the user's currently tracked location that is smaller than a previous first distance to the user's previously tracked location. A second weight can be assigned to a second potential destination having a current second distance to the user's currently tracked location that is larger than a previous second distance to the user's previously tracked location. Thereby the first weight can be higher than the second weight.

In some example embodiments, predicting the at least one destination can include assigning a respective weight to each of the plurality of potential destinations based on a number and/or a time of past visits of the respective potential destination indicated by the historic travel data. Thus, a visit time and/or frequency can also be taken into account in order to improve the accuracy of the prediction.

In some example embodiments, assigning the respective weight can include assigning a first weight to a first potential destination having a first number of past visits by the user and assigning a second weight to a second potential destination having a second number of past visits by the user. If the first number is larger than the second number, the first weight can be higher than the second weight. In other words, more often visited past destinations can be considered more likely.

In some example embodiments, predicting the at least one destination can include assigning a respective combined weight to each of the plurality of potential destinations based on the respective potential destination's respective distance to the user's current location, further based on a tracked change of the distance between the respective potential destination and the user's current location, and further based on a number of past visits of the respective potential destination indicated by the historic travel data. Thus, the aforementioned embodiments or prediction features can also be combined in order to further improve the prediction.

In some example embodiments, the method can further comprise providing information on a predicted route to the at least one predicted destination. Such information can include relevant real time information, e.g. traffic, incident alert, dynamic route update, gas station, POI or event recommendation, just name a few, during a live trip.

In some example embodiments, the method can further comprise merging a plurality of historic travel paths that deviate from each other by less than a predefined tolerance range into one historic travel path. Thus, similar historic routes and/or destinations can be merged to one, which can reduce computation cost and improve the prediction accuracy.

According to a further aspect, the present disclosure also provides an apparatus for predicting a destination of a user's current travel path. The apparatus comprises processing circuitry which is configured to generate real-time travel data associated with the user's current travel path, the real-time travel data comprising the user's current location. The processing circuitry is also configured to determine a plurality of potential destinations on the current travel path based on historic travel data associated with one or more historic travel paths of the user. The processing circuitry is further configured to predict or estimate at least one destination of the current travel path from the plurality of potential destinations based on tracking a distance between the user's current location and each of the plurality of potential destinations.

The skilled person having benefit from the present disclosure will appreciate that the apparatus can be part of a navigation system comprising one or more GPS receivers, memory or storage for storing present and historic travel data, and one or more processors to run algorithms to predict the at least one destination of the current travel path. It can be an on-board apparatus installed in a vehicle, such as a car or a truck, or an apparatus implemented in a portable computing device, such as a smartphone or a tablet PC.

In some example embodiments, the processing circuitry can be configured to assign a respective combined weight to a potential destination based on the potential destination's respective distance to the user's current location, based on a tracked change of the distance due to the user's movement, and based on a number of past visits of the potential destination indicated by the historic travel data, and to predict the at least one destination based on the combined weight.

According to a further aspect, the present disclosure also provides a vehicle. The vehicle comprises a receiver configured to receive or determine geolocation information associated with the vehicle's current travel path from a plurality of satellites, the geolocation information being indicative of the vehicle's current location. The vehicle further comprises a memory configured to store historic travel data associated with one or more historic travel paths of the vehicle. The vehicle further comprises a processor configured to determine a plurality of potential destinations of the current travel path based on the historic travel data and to predict a destination of the current travel path based on tracking a distance from the user's current location to each of the plurality of potential destinations.

In some example embodiments, the vehicle's processor can be configured to predict the destination of the current travel path based on the destination's respective distance to the vehicle's current location, based on a tracked change of the distance due to the vehicle's current travel trajectory, and based on a number of past visits of the destination indicated by the historic travel data.

Embodiments of the present disclosure can provide a low-complexity concept for personal live trip prediction that can improve user's real time driving experience.

Other objects, advantages and novel features of the present invention will become apparent from the following detailed description of one or more preferred embodiments when considered in conjunction with the accompanying drawings.

BRIEF DESCRIPTION OF THE DRAWINGS

Some examples of apparatuses and/or methods will be described in the following by way of example only, and with reference to the accompanying figures, in which.

DETAILED DESCRIPTION OF THE DRAWINGS

Figure 1:
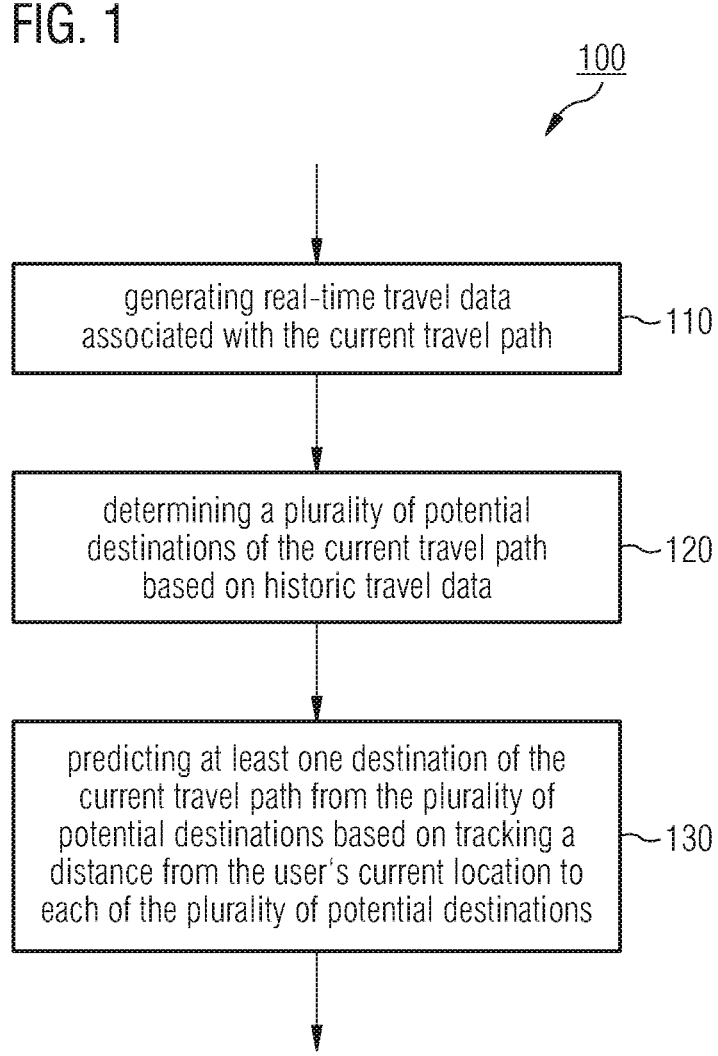
FIG. 1 shows a flow chart of a method of predicting a destination of a user's current travel path.

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B. An alternative wording for the same combinations is "at least one of A and B". The same applies for combinations of more than two Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality.

Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Current navigation systems require users to set their destination before traveling in order to get related services. However, in many cases users may not set up the destination in the navigation system because the travel in a familiar area, the destination is too cumbersome to input, or because they do not know the destination information that navigation system can take. For example, a name of a desired restaurant may be known while its exact address is unknown.

In such situations, users may still expect a personalized, intelligent and contextual journey management system which can predict the user's live trip and notify users of any event that is related to the predicted destination and route. If one is able to predict a user's trip, then one may also be able to provide related personal, intelligent and contextual services. The user's driving experience may be improved, as we know where users are going and which route they are choosing. Relevant notifications about congestion, road construction, lane closure, events and other relevant information may be sent to the users. Also, relevant POIs for users may be recommended. The present disclosure proposes an effective, low-complexity approach to achieve live trip prediction.

FIG. 1 illustrates a flow chart of a method 100 for predicting a destination of a user's current travel path or trajectory in accordance with embodiments of the present disclosure.

Method 100 comprises generating 110 real-time travel data associated with the user's current travel path. The real-time data is associated with a current travel trajectory of the user and comprises the user's current location. Generating 110 the real-time travel data may include evaluating data on time and known positions of a plurality of specialized geolocation system satellites in order to determine the user's current location, for example. A sequence of current location samples yields a current travel trajectory up to the most recent current location sample.

According to the present disclosure, it is of interest to predict or estimate a destination of the user's current travel trajectory or path. This prediction is based on stored historic travel data associated with one or more historic (or past) travel paths of the user. Thus, method 100 also comprises determining 120 a plurality of potential destinations of the current travel path based on historic travel data associated with one or more historic travel paths of the user. For that purpose, the historic travel data can be stored in computer memory. The computer memory may be on-board memory or memory of a remote computer cloud service, for example. In the latter case an adequate wireless data interface to the remote memory would be needed of course. The stored historic travel data may comprise historic destinations of the user. It may also comprise history (past) start positions (origins) of routes to the historic destinations.

Thus, the past start points may serve as potential destinations as well. In some implementations, the historic travel data can even comprise historic travel paths of other users, for example friends and/or family members.

In a further act 130, method 100 predicts at least one destination of the current travel path from the plurality of potential destinations based on tracking a distance from the user's current location to each of the plurality of potential destinations. That is to say, the live-trip prediction is based on evaluating distances of the user's current location to any one of the potential destinations. This can be done on absolute distances and/or based on changes of said differences, as will be described in the sequel.

Figure 2:
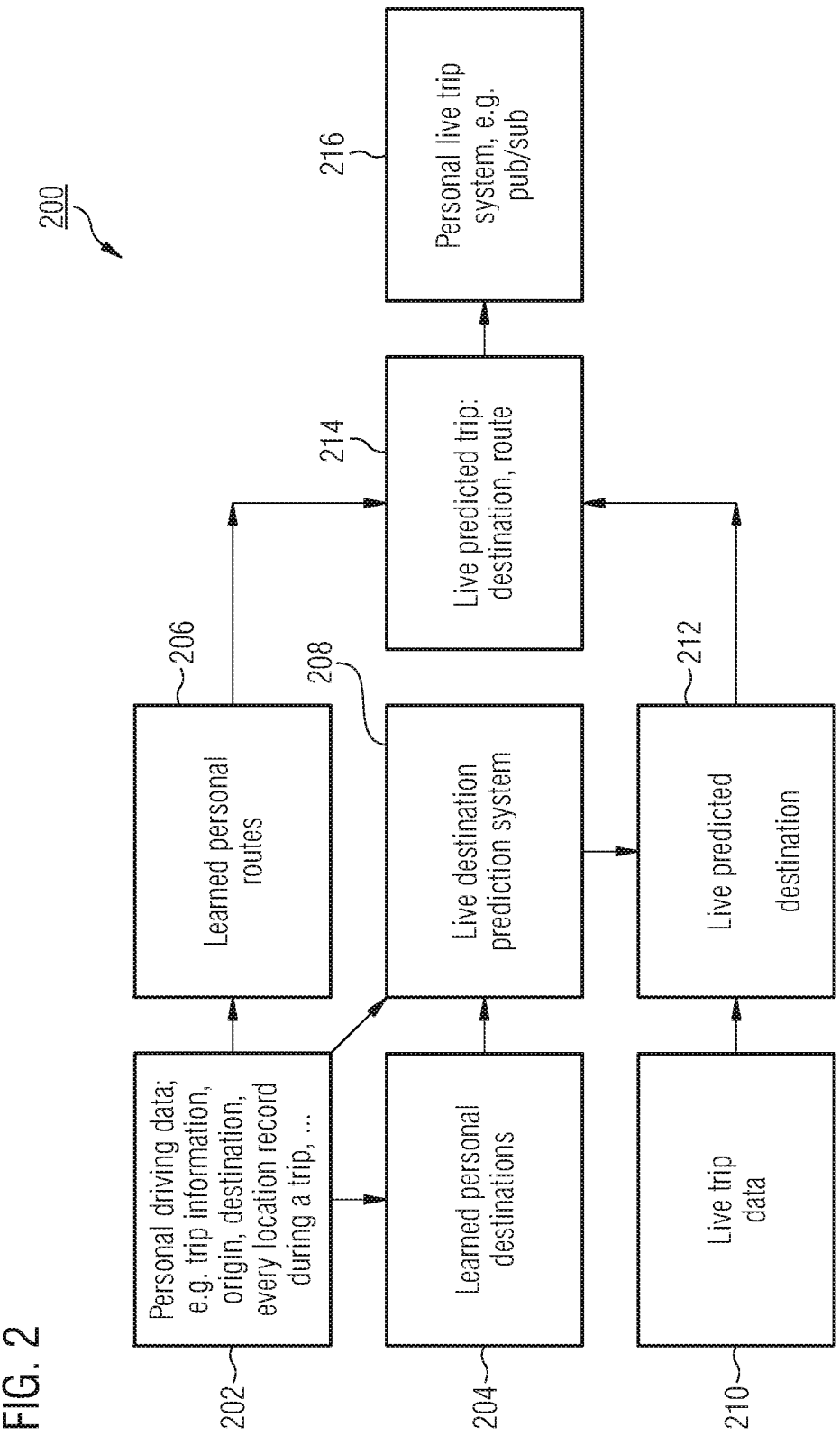
FIG. 2 shows a further chart depicting an example process of predicting a user's live trip.

An alternative, more detailed processing diagram 200 is shown in FIG. 2.

Act 202 is dedicated to collecting and storing historic travel data, such as trip information, origin, destination, every location record during a trip, etc. Travel data of each trip is collected and stored, such that travel data of a current trip becomes historic travel data for future trips.

During act 204 personal destinations can be learned from the collected historic travel data. For example, the user's preferred past destinations can be extracted from the historic travel data by using clustering. Here, clustering can be understood as merging a plurality of historic travel paths and/or destinations that deviate from each other by less than a predefined tolerance range into one. For example, the parking spots at a preferred mall may slightly differ for each visit. Nonetheless the destination, the mall, is always the same. Therefore, history destinations within a certain radius may be merged to one. The predefined tolerance range can depend on the topography, for example. In a densely covered city, the predefined tolerance range may be smaller than in less covered rural areas.

Something similar can be done during act 206 for the user's past travel routes. Similar past routes within a predefined tolerance range from each other can be merged to one, which can reduce computation cost and improve the prediction accuracy.

Act 208 selects or predicts a plurality of potential destinations for the user's current trip based on the stored historic travel data and the learned personal destinations of acts 202 and 204.

During act 210 live trip data related to the user's present trajectory is collected. The live trip data can be used together with the historic travel data to predict user's destination dynamically and accurately. For example, at the start of the trip, the system might predict that the user is going to a shopping mall. After the user passes the shopping mall, the system could predict that the user is actually going to an airport.

Based on the live trip data and the potential destinations, one or more destinations can be predicted on the fly during driving in act 212. Here, the system can learn how the user's intention changes during driving. By considering the driver's current location, driving path, driving history, the system is built to predict user's destination and can adaptively and automatically provide better estimates with more driving records collected. In order to build a personalized low-complexity live destination prediction system, the following factors, but not limited thereto, can be used:

Distance change: the distance between the user's current location and each predicted destination can be tracked to determine to which location the user is actually going to. For, example during the driving, the user's current location should get closer instead of farther to the destination. Thus, predicting the at least one destination in act 212 may comprise assigning a respective weight or score to each of the plurality of potential destinations based on a tracked change of distance between the respective potential destination and the user's current location due to the user's movement. Thereby the weight, hence the probability, of the potential destination may be increased if its distance to the user's current location has decreased due to the user's movement. Likewise, the weight of the potential destination may be decreased if its distance to the user's current location has increased due to the user's movement.

Distance: the distance to the destination may also be helpful by distinguishing farther destinations and closer destinations. For example, a user who lives in a rural area but works in a city, may have several potential destinations in two different areas. When the user is in the rural area, he would be more likely to go to the potential destinations in rural area instead of the potential destinations in the city area. Thus, predicting the at least one destination in act 212 may comprise assigning a respective weight to each of the plurality of potential destinations based on the respective potential destination's distance to the user's current location.

User profile: the user profile can describe the user's preference to each potential or candidate destination, including user's visit number to each destination, time of day of the visit, day of week of the visit, and etc. Thus, predicting the at least one destination in act 212 may comprise assigning a respective weight to each of the plurality of potential destinations based on a time and/or number of past visits of the respective potential destination indicated by the historic travel data. Time may also be taken into consideration. For example, in the morning of a weekday, the most likely initial prediction may be the location of the user's work since this is the user's most common location in the morning of a weekday. Likewise, in the evening of a weekday the most likely initial prediction may be the location of the user's home. On particular weekdays, the most likely initial predictions may deviate according to the user's habits. Maybe he or she regularly visits a gym on Wednesday evening and/or goes to a mall on Thursdays.

The proposed live trip prediction may for example predict the N-best potential destinations that the user might be going to based on the current driving path and the learned model.

Act 214 can leverage the predicted destination and learned routes to determine potential routes that the user might actually be driving.

In some example implementations, an intelligent driving notification system can, e.g. be designed as publish/subscribe (see reference sign 216), to automatically publish notifications to the relevant driver, as subscriber, with relevant information for the predicted route.

Some example implementations for predicting destinations will be explained in more detail in the following with regard to FIGS. 3a-3d.

Figure 3A:
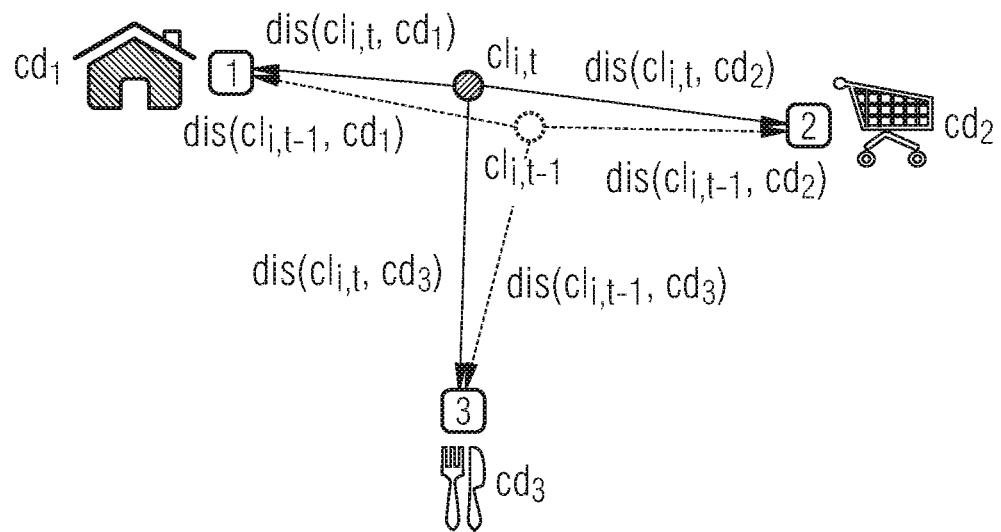
FIG. 3a illustrates a concept of weighting a potential destination in accordance with its distance to the user's current location.

FIG. 3a relates to weighting a potential destination based on the change of distance between the potential destination and the user's current location due to the user's movement. This is based on the idea that the driver will more likely drive in the direction to the envisaged destination. Thus, the distance from the user to the potential destination should keep decreasing with tolerance. Given the current location of user i at time t $cl_{i,t}$, $t \in T$, candidate destination k $cd_k$, counter cnt, an example distance-based score function for each candidate destination at time t can be formulated as:

$$sDis(cd_k \backslash cl_{i,t}) = f(sDis(cd_k \backslash cl_{i,t-1}), \Delta dis(cl_{i,t-1} \rightarrow cl_{i,t}, cd_k))$$
$$\Delta dis(cl_{i,t-1} \rightarrow cl_{i,t}, cd_k) = dis(cl_{i,t-1}, cd_k) - dis(cl_{i,t}, cd_k)$$

An example distance-based instant score at time t can be defined as:

$$\max Dis_t = \max_t (\Delta dis(cl_{i,t-1} \rightarrow cl_{i,t}, cd_k))$$

$$sInsDis(cd_k \mid cl_{i,t}) = \begin{cases} \frac{\Delta dis(cl_{i,t-1} \rightarrow cl_{i,t}, cd_k)}{\max_t (\Delta dis(cl_{i,t-1} \rightarrow cl_{i,t}, cd_k))} & \text{if } \Delta dis(cl_{i,t-1} \rightarrow cl_{i,t}, cd_k) > 0 \\ 0 & o.w. \end{cases}$$

An example cumulative distance-based score then can be calculated as $$sDis(cd_k \mid cl_{i,t}) = \lambda \times \left( \frac{sDis(cd_k \mid cl_{i,t-1}) \times cn_{t-1} + sInsDis(cd_k \mid cl_{i,t})}{cn_t} \right) +$$
$$(1 - \lambda) \times sInsDis(cd_k \mid cl_{i,t})$$

The cumulative distance-based score $sDis(cd_k \backslash cl_{i,t})$ acts as a low pass filter to filter out respective short-term fluctuations of distance changes. In the example of FIG. 3a, $\Delta dis(cl_{i,t-1} \rightarrow cl_{i,t}, cd_1) > 0$, which means that the distance from current user location $cl_{i,t}$ to potential destination $cd_1$ has become smaller than from the previous user location $cl_{i,t-1}$ to potential destination $cd_1$. For the other two potential destinations $cd_2$ and $cd_3$, the respective distances to the current user location $cl_{i,t}$ have become larger than to the previous user location $cl_{i,t-1}$. Thus, $\Delta dis(cl_{i,t-1} \rightarrow cl_{i,t}, cd_2) < 0$ and $\Delta dis(cl_{i,t-1} \rightarrow cl_{i,t}, cd_3) < 0$. This leads to $sInsDis(cd_2 \backslash cl_{i,t}) = sInsDis(cd_3 \backslash cl_{i,t}) = 0$.

In this example, a first weight or score $sInsDis(cd_1 \backslash cl_{i,t})$ is assigned to the first potential destination $cd_1$ having a current first distance $dis(cl_{i,t}, cd_1)$ to the user's currently tracked location cli,t that is smaller than a previous first distance $dis(cl_{i,t-1}, cd_1)$ to the user's previously tracked location $cl_{i,t-1}$. A second weight $sInsDis(cd_2 \backslash cl_{i,t})$ is assigned to the second potential destination $cd_2$ having a current second distance $dis(cl_{i,t}, cd_2)$ to the user's currently tracked location $cl_{i,t}$ that is larger than a previous second distance $dis(cl_{i,t-1}, cd_2)$ to the user's previously tracked location $cl_{i,t-1}$. Here, the first weight is higher than the second weight because the first distance has decreased due to the user's movement and the second distance has increased due to the user's movement. Since $sInsDis(cd_1 \backslash cl_{i,t}) > 0$ and $sInsDis(cd_1 \backslash cl_{i,t}) = 0$, the cumulative distance-based score $sDis(cd_1 \backslash cl_{i,t})$ for the first potential destination will increase, while the cumulative distance-based score $sDis(cd_2 \backslash cl_{i,t})$ for the second potential destination will remain unchanged or even decrease.

Thus, predicting the at least one destination can comprise assigning a respective weight to each of the plurality of potential destinations based on a tracked change of distance between the respective potential destination and the user's current location due to the user's movement.

Figure 3B:
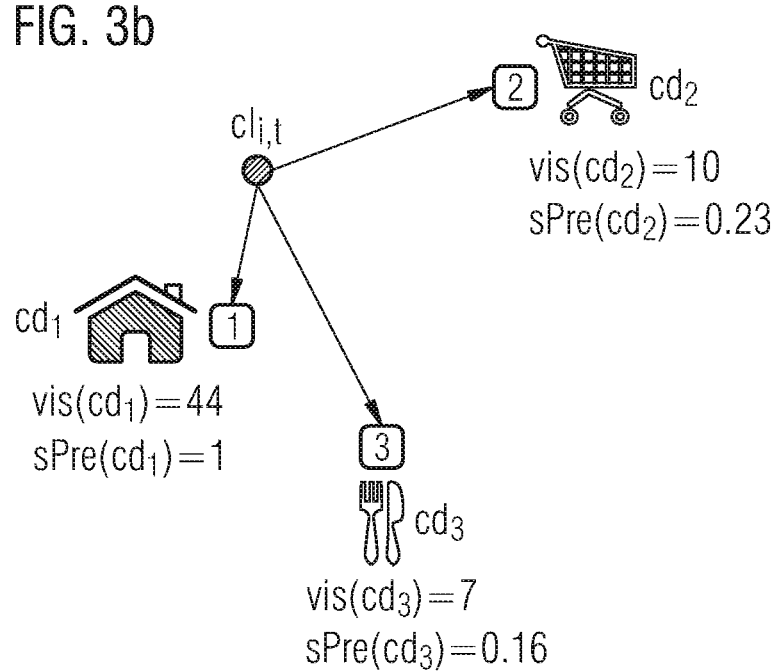
FIG. 3b illustrates a concept of weighting a potential destination in accordance with its visit frequency.

FIG. 3b relates to weighting the potential destination based on a number of past visits of the respective potential destination indicated by the historic travel data. This is based on the idea that the driver will more likely go to the places visited mostly in the past. The visit frequency in the past can represent the likelihood of the destination.

Given driving history of user i, the preference score for each candidate destination k $cd_k$ can be calculated based on the number of visits, e.g.

$$sPre(cd_k) = \frac{vis(cd_k)}{\max_k(vis(cd_k))}$$

wherein $\max_k(vis(cd_k))$ denotes the maximum number of visits over all candidate destinations.

In the example of FIG. 3b, candidate destination $cd_1$ has been visited 44 times before. Candidate destination $cd_2$ has been visited 10 times before. Candidate destination $cd_3$ has been visited 7 times before. Thus, the most likely destination based on the preference score will be candidate destination $cd_1$ having a score of $sPre(cd_1)=1$ compared to candidate destination $cd_2$ having a score of $sPre(cd_2)=10/44$, and candidate destination $cd_3$ having a score of $sPre(cd_3)=7/44$.

In this example, a first weight $sPre(cd_1)$ is assigned to a first potential destination $cd_1$ having a first number of past visits by the user, a second weight $sPre(cd_2)$ is assigned to a second potential destination $cd_2$ having a second number of past visits by the user. If the first number is larger than the second number then the first weight is higher than the second weight.

Thus, predicting the at least one destination can comprise assigning a respective weight to each of the plurality of potential destinations based on a number of past visits of the respective potential destination indicated by the historic travel data.

Figure 3C:
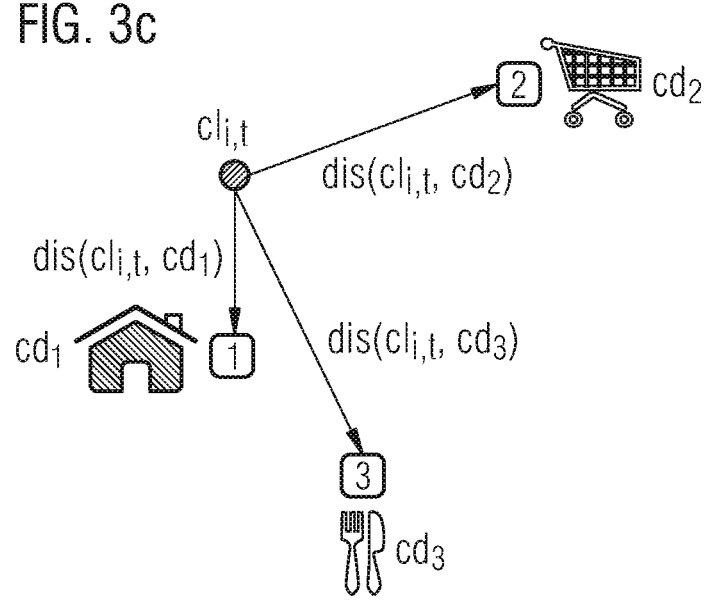
FIG. 3c, d illustrate a concept of weighting a potential destination in accordance with its distance change to the user's current location.

FIG. 3c relates to weighting a potential destination based on the respective potential destination's distance to the user's current location. This is based on the idea that if the user's current location is very close to one potential destination and other potential destinations are in the same driving direction, the system can provide more predictable routes which means the closer location can be considered as the most likely destination first. If the driver passes the closer destination, the system may adaptively adjust the weights.

Given current location of user i at time t $cl_{i,t}$, an example score representing the distance to candidate destination can be formulated as:

$$sDisToDes(cd_k \mid cl_{i,t}) = 1 - \frac{1}{1 + e^{-(\varphi \times (dis(cl_{i,t}, cd_k)-D)}}$$

Figure 3D:
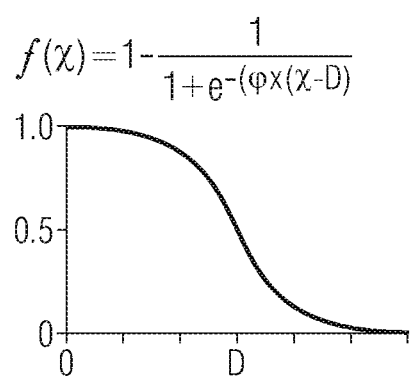
Figure 3D:
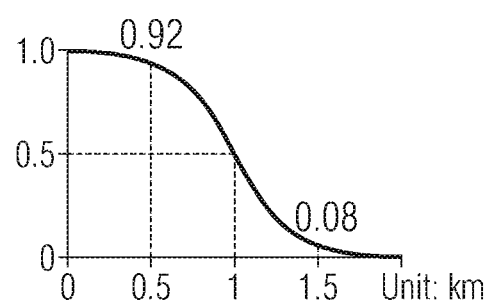

The course of this example score function is illustrated in FIG. 3d. As can be seen, the score will decrease with increasing distance between current user location and candidate destination. The parameters φ and D may be dependent on the type of area (rural, city, etc.) as well as on topography, for example. In FIG. 3d they are chosen to φ=0.005, D=1.

In the example of FIG. 3c, candidate destination $cd_1$ has a distance $dis(cl_{i,t}, cd_1)$ to the i-th user's current location $cl_{i,t}$. Candidate destination $cd_2$ has a distance $dis(cl_{i,t}, cd_2)$ to the i-th user's current location $cl_{i,t}$. Candidate destination $cd_3$ has a distance $dis(cl_{i,t}, cd_3)$ to the i-th user's current location $cl_{i,t}$. $dis(cl_{i,t}, cd_1)$ is smaller than the other two distances. Therefore, it may be assigned the largest weight or score $sDisToDes(cd_1 \mid cl_{i,t})$ according to the above formula. More generally, a first weight or score may be assigned to a first potential destination having a first distance to the user's current location and a second, smaller weight may be assigned to a second potential destination having a second distance to the user's current location, if the second distance is larger than the first distance. The skilled person having benefit from the present disclosure will appreciate however that the score representing the distance to candidate destination might also be computed differently in other implementations.

Thus, predicting the at least one destination can comprise assigning a respective weight to each of the plurality of potential destinations based on the respective potential destination's distance to the user's current location.

While the individual scores described with regard to the previous Figures may be applied individually in some implementations, a more accurate prediction may be achieved by a combination of two or more of the individual scores. In some embodiments, all three scores can be combined to a combined score for each candidate destination. Thus, predicting the at least one destination may comprise assigning a respective combined weight to each of the plurality of potential destinations based on the respective potential destination's respective distance to the user's current location, based on a tracked change of the distance between the respective potential destination and the user's current location, and based on a number of past visits of the respective potential destination indicated by the historic travel data. An example of a (linearly) combined score can be formulated as $$score(cd_k \mid cl_{i,t}) = \alpha \times sDis(cd_k \mid cl_{i,t}) + \beta \times sDisToDes(cd_k \mid cl_{i,t}) + \gamma \times sPre(cd_k),$$

$$\alpha+\beta+\gamma=1.$$

The skilled person having benefit from the present disclosure will appreciate that other combined scores are possible as well.

| Desination | Frequency |
|---|---|
| D1 | 44 |
| D2 | 1 |
| D3 | 7 |
| D4 | 13 |
| D5 | 9 |
| D6 | 8 |
| D7 | 3 |
| D8 | 3 |
| D9 | 1 |
| D10 | 3 |
| D11 | 2 |
| D12 | 3 |
| D13 | 1 |
| D14 | 2 |
| D15 | 1 |

Table 1 refers to an experimental dataset showing historic trip destinations with historic trip lengths longer than 1 km by one driver. There are 15 historic destinations, 101 historic trips in total. Assume a basic implementation by only considering the historic visit frequency. The predicted most likely destination would be always D1 with the highest visit frequency. The accuracy would be 44/101=43.6%. By selecting the two most likely destinations D1 and D4, the accuracy would be (44+13)/101=56.4%.

|  | Change of Distance | | Distance to Destination | | Visit Frequency | | Combination | |
| --- | --- | --- | --- | --- | --- | --- | --- | --- |
|  | 1-best | 2-best | 1-best | 2-best | 1-best | 2-best | 1-best | 2-best |
| 25% Sample | 32.7% | 57.4% | 11.9% | 30.7% | 43.6% | 56.4% | 55.4% | 73.3% |
| 50% Sample | 45.5% | 69.3% | 41.6% | 60.4% | 43.6% | 56.4% | 72.3% | 83.2% |
| 75% Sample | 59.4% | 78.2% | 66.3% | 88.1% | 43.6% | 56.4% | 79.2% | 92.1% |
| 100% Sample | 83.2% | 92.1% | 100.0% | 100.0% | 43.6% | 56.4% | 100.0% | 100.0% |

Table 2 illustrates various prediction accuracies. The first row refers to considering 25% of (location) samples of the current trip. The second row refers to considering 50% of the (location) samples of the current trip. The third row refers to considering 75% of the (location) samples of the current trip. The fourth row refers to considering 100% of the (location) samples of the current trip. The different columns of Table 2 relate to respective features which can be used to predict the live destination. "ChangeOfDistance" refers to the accumulative change of distance, "DistanceToDestination" refers to the distance to destination, "VisitFrequency" refers to the visit number of destination in the past, "Combination" merges all three features to improve the prediction. "N-best" means the accuracy by selecting best N destinations. As can be seen, the system can predict more than 70% of the destinations in the middle of the trip (50% of the samples). Live destination prediction can yield much better than offline destination prediction (e.g. "VisitFrequency" only).

Figure 4:
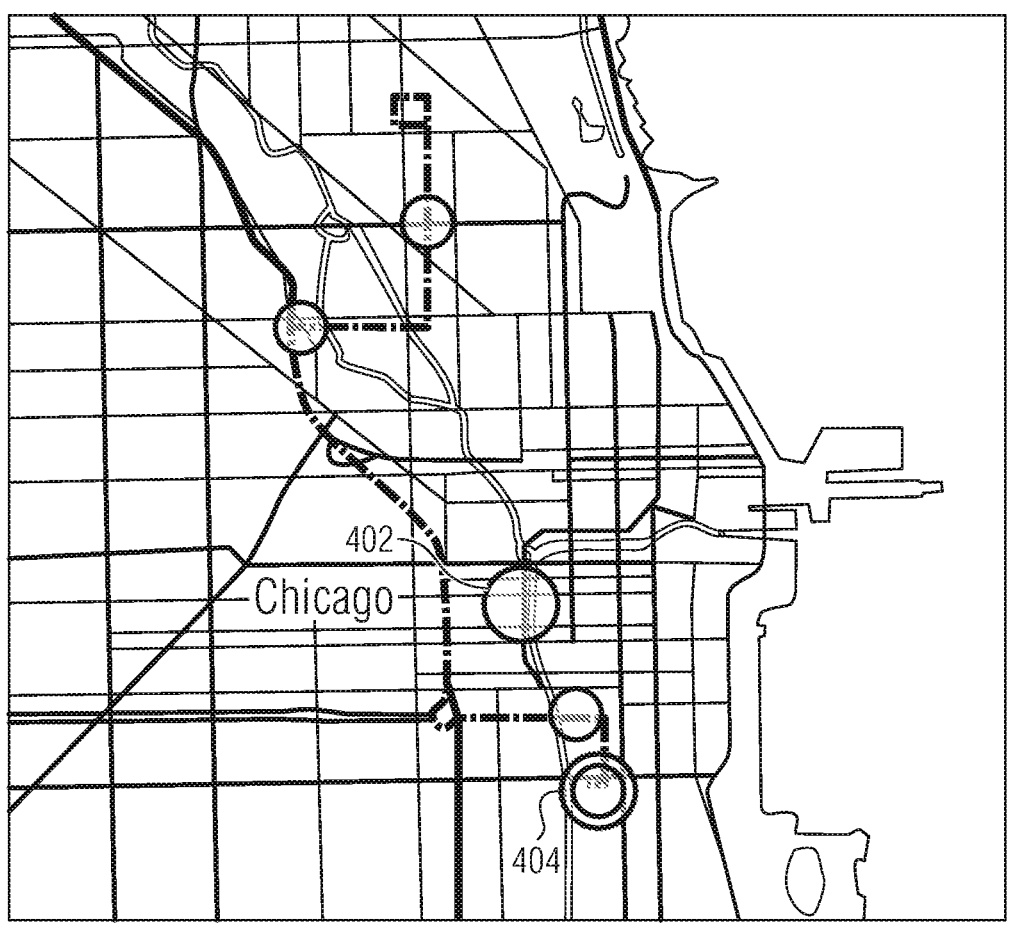
FIG. 4 shows a map with predicted destinations.

In the example scenario of FIG. 4, an example implementation of the live prediction system first predicts that the user is going to the first but wrong destination 402. After 50% of samples are collected and the user passes the first predicted destination, the system can predict the user is actually going to the second correct destination 404.

Figure 5:
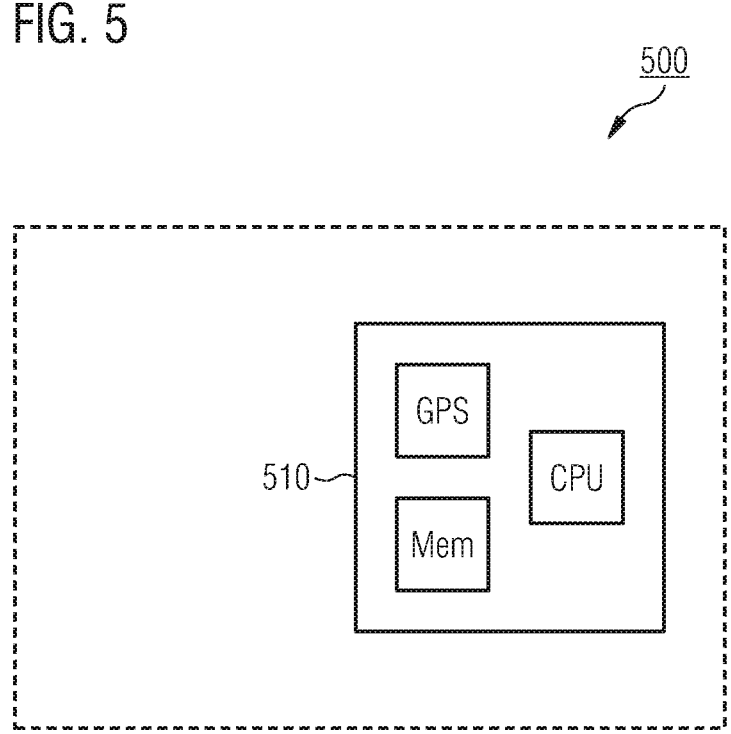
FIG. 5 shows a block diagram of an example apparatus for predicting a destination of a user's current travel path.

The skilled person having benefit from the present disclosure will appreciate that embodiments of the destination prediction concept can be implemented into a navigation system. This can be a navigation system built into a vehicle or a navigation system running on a portable device such as a smartphone. A schematic block diagram of such a navigation apparatus 500 is shown in FIG. 5.

Apparatus 500, which can be a vehicle or a smartphone, for example, comprises processing circuitry 510 which is configured to generate real-time travel data associated with the user's current travel path, wherein the real-time travel data comprises the user's current location.

Thus, processing circuitry 510 can comprise GPS circuitry, for example. Processing circuitry 510 is further configured to determine a plurality of potential destinations on the current travel path based on historic travel data associated with one or more historic travel paths of the user. Thus, processing circuitry 510 can comprise computer memory or storage. Processing circuitry 510 is further configured to predict at least one destination of the current travel path from the plurality of potential destinations based on tracking a distance between the user's current location and each of the plurality of potential destinations. Thus, processing circuitry 510 can comprise one or more CPUs.

To summarize, embodiments of the present disclosure provide journey modeling which can learn on personal driving history data, origins, destinations, routes, and other relevant information. Embodiments are able to generalize personal routes, generate relevant features to predict driver's intention that can significantly improve trip prediction. With live travel data as context data and journey modeling, embodiments are able to provide adaptive and high performed live trip prediction model that can predict live trip, and then provide real time relevant information for the users.

Embodiments offer a novel technical approach. A live trip is predicted based on live travel path and prediction system learned from historical driving data. Thus, it can accurately predict a trip that enables personalized, intelligent and contextual awareness services. Embodiments can run dynamically based on journey pattern as well as live context without demanding the data from massive users. Embodiments propose a low-complexity prediction algorithm which can perform in real time because it can significantly reduce computational, storage and cost. Instead of link-based or grid-based methods which need to search the all spaces to find the destination/route, embodiments firstly search the best-n destinations, then use the learned routes going to these destinations to predict live driving routes. Embodiments can improve user driving experience by accurate trip prediction that is minimize the manual inputs from users and provide relevant contextual awareness information. Embodiments can be regarded as enabler to bring the personal, intelligent and context-awareness differentiation: it can be used for trip alerts including traffic, incident, road condition, event and lane closure, and sending advertisements along the predicted route, just name a few. The proposed accurate live trip prediction has potential opportunity to drive consumer and business ecosystem, share the predicted destination to relevant business partners to initiate the reservation or loyalty engagement service on the move.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for pedagogical purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a signal", "means for generating a signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and nonvolatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that although a dependent claim may refer in the claims to a specific combination with one or more other claims other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of operating a navigation device comprising: a GPS receiver, a display and a processor, the method comprising:
    generating, via the GPS receiver, real-time travel data delineating a current travel path, the real-time travel data comprising a current GPS location of a user of the navigation device;
    determining, via the processor, a plurality of potential destinations of the current travel path, based on historic travel data delineating one or more historic travel paths of the user;
    predicting, via the processor, a predicted destination of the current travel path, from among the plurality of potential destinations, based on tracking a distance from the user's current location on the current travel path to each of the plurality of potential destinations;
    predicting, via the processor, a predicted route to the predicted destination; and
    displaying, via the display, information regarding the predicted route and/or the predicted destination,
    wherein predicting at least one destination includes assigning a respective weight to each of the plurality of potential destinations, each respective weight being based on a change-of-distance scalar between a respective potential destination and the user's current location resulting from a movement of the user, while filtering out short-term fluctuations in the change-of-distance.

2. The method of claim 1, wherein said predicting the predicted destination comprises assigning a respective weight to each of the plurality of potential destinations based on a respective distance of each of the plurality of potential destination to the user's current location.

3. The method of claim 2, wherein said assigning the respective weight comprises:
    assigning a first weight to a first potential destination having a first distance to the user's current location; and
    assigning a second weight to a second potential destination having a second distance to the user's current location, wherein the second distance is larger than the first distance,
    wherein the first weight is higher than the second weight.

4. The method of claim 1,
    wherein the respective weight of each of the plurality of potential destinations is increased if a corresponding distance from a respective one of the plurality of potential destinations to the user's current location has decreased due to the movement of the user, and
    wherein the weight of each of the plurality of potential destinations is decreased if a corresponding distance from a respective one of the plurality of potential destinations to the user's current location has increased due to the movement of the user.

5. The method of claim 1, wherein said assigning the respective weight comprises:
assigning a first weight to a first potential destination having a current first distance to the user's current location that is smaller than a previous first distance to a previous user location; and
assigning a second weight to a second potential destination having a current second distance to the user's current location that is larger than a previous second distance to the previous user location,
wherein the first weight is higher than the second weight.

6. The method of claim 4, wherein said assigning the respective weight comprises:
assigning a first weight to a first potential destination having a current first distance to the user's current location that is smaller than a previous first distance to a previous user location; and
assigning a second weight to a second potential destination having a current second distance to the user's current location that is larger than a previous second distance to the previous user location,
wherein the first weight is higher than the second weight.

7. The method of claim 1, wherein predicting the predicted destination comprises assigning a respective weight to each of the plurality of potential destinations based on a number and/or time of past visits to a respective one of the plurality of potential destinations indicated by the historic travel data.

8. The method of claim 7, wherein assigning the respective weight comprises:
assigning a first weight to a first potential destination having a first number of past visits by the user,
assigning a second weight to a second potential destination having a second number of past visits by the user, wherein the first number is larger than the second number, wherein the first weight is higher than the second weight.

9. The method of claim 1, wherein predicting the predicted destination comprises assigning a respective combined weight to each of the plurality of potential destinations based on a respective potential destination's distance to the user's current location, based on a tracked change of a distance between the respective potential destination and the user's current location, and based on a number of past visits of the respective potential destination indicated by the historic travel data.

10. The method of claim 9, wherein displaying the information includes displaying a notification about at least one of traffic congestion, road construction, lane closure, and points of interest on the predicted route.

11. The method of claim 1, further comprising merging a plurality of historic travel paths that deviate from each other by less than a predefined tolerance range into one historic travel path.

12. A navigation apparatus, the apparatus comprising:
a GPS receiver, a display and processing circuitry,
wherein the processing circuitry is configured to:
generate real-time travel data via the GPS receiver, the real-time travel data comprising the user's current GPS location and delineating a current travel path;
determine a plurality of potential destinations on the current travel path, based on historic travel data delineating one or more historic travel paths of the user;
predict a predicted destination of the current travel path, from among the plurality of potential destinations, based on tracking a distance between the user's current location on the current travel path and each of the plurality of potential destinations;
predict a predicted route to the predicted destination; and
display, via the display, information regarding the predicted route and/or the predicted destination,
wherein predicting at least one destination includes assigning a respective weight to each of the plurality of potential destinations, each respective weight being based on a change-of-distance scalar between a respective potential destination and the user's current location resulting from a movement of the user, while filtering out short-term fluctuations in the change-of-distance.

13. The apparatus of claim 12, wherein the processing circuitry is further configured to:
assign a respective combined weight to each of the plurality of potential destinations based on a respective potential destination's distance to the user's current location, based on a tracked change of a distance due to a movement of the user, and based on a number of past visits of the respective potential destination indicated by the historic travel data, and
predict the predicted destination based on the combined weight.

14. The apparatus of claim 12, wherein the processing circuitry is further configured to predict the predicted destination by assigning a respective weight to each of the plurality of potential destinations based on a respective distance of each of the plurality of potential destination to the user's current location.

15. The apparatus of claim 14, wherein the processing circuitry is configured to assign the respective weight by:
assigning a first weight to a first potential destination having a first distance to the user's current location; and
assigning a second weight to a second potential destination having a second distance to the user's current location, wherein the second distance is larger than the first distance,
wherein the first weight is higher than the second weight.

16. The apparatus of claim 12, wherein the processing circuitry is configured to predict the at least one destination by assigning a respective weight to each of the plurality of potential destinations based on a tracked change of distance between each of the plurality of potential destinations and the user's current location resulting from a movement of the user.

17. A vehicle navigation device, comprising:
a receiver configured to receive geolocation information associated with the vehicle's current travel path from a plurality of satellites, the geolocation information being indicative of the vehicle's current GPS location;
a memory configured to store historic travel data delineating one or more historic travel paths of the vehicle; and
a processor configured to:
determine a plurality of potential destinations of the current travel path based on the historic travel data,
predict a destination of the current travel path based on tracking a distance from the vehicle's current location on the current travel path to each of the plurality of potential destinations, and
predict a predicted route to the predicted destination; and
a display configured to display information regarding the predicted route and/or the predicted destination, wherein predicting at least one destination includes assigning a respective weight to each of the plurality of potential destinations, each respective weight being based on a change-of-distance scalar between a respective potential destination and the user's current location resulting from a movement of the user, while filtering out short-term fluctuations in the change-of-distance.

18. The vehicle of claim 17, wherein the processor is configured to predict the destination of the current travel path based on the destination's respective distance to the vehicle's current location, based on a tracked change of a distance due to the vehicle's current travel trajectory, and based on a number of past visits of the destination indicated by the historic travel data.

* * * * *